C. G. HERMAN.
COMPRESSED AIR LOCOMOTIVE.
APPLICATION FILED JAN. 16, 1909.
959,219.
Patented May 24, 1910.
2 SHEETS—SHEET 1.
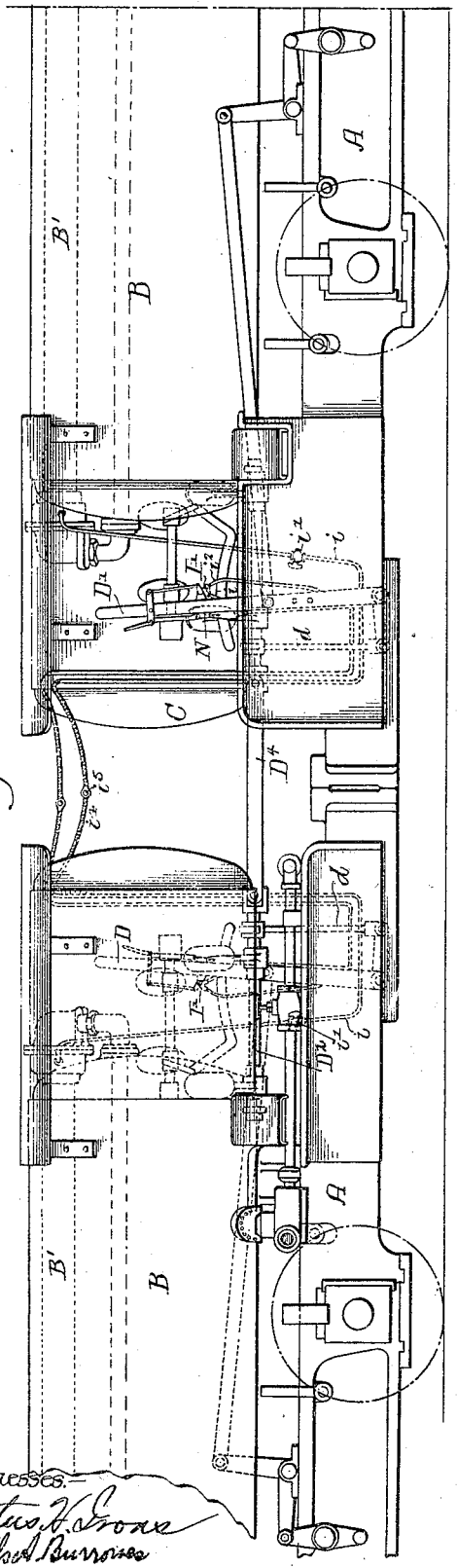
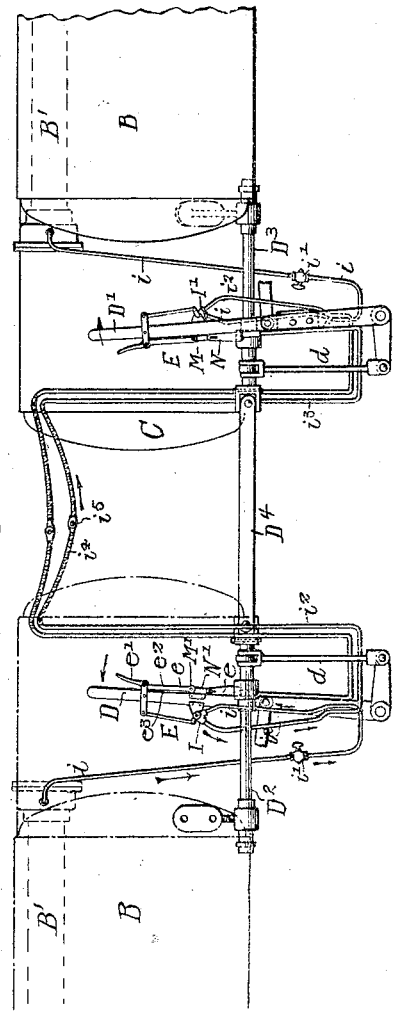
Inventor:—
Charles G. Herman
by his Attorneys,

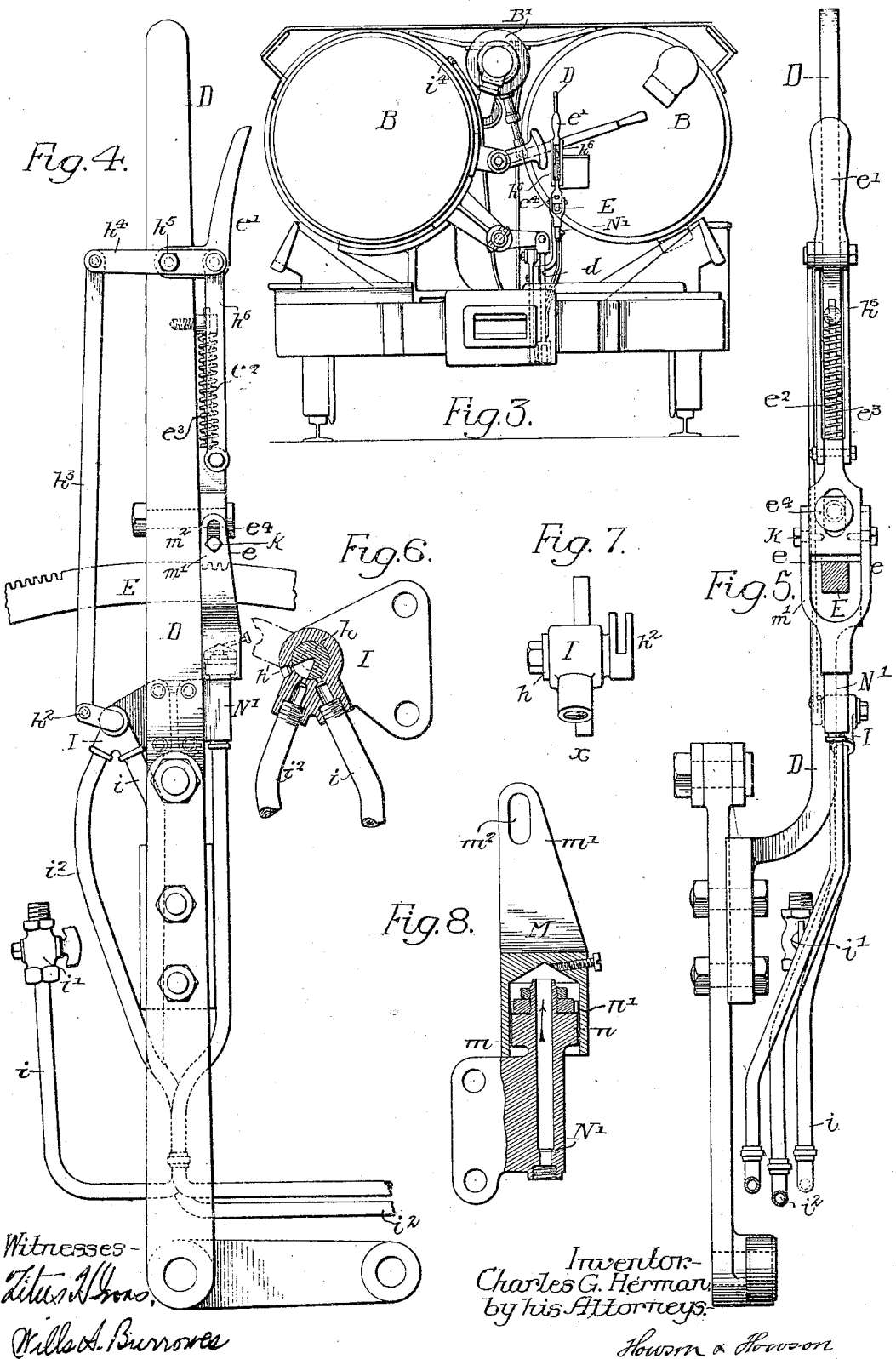

UNITED STATES PATENT OFFICE.

CHARLES G. HERMAN, OF PHILADELPHIA, PENNSYLVANIA, ASSIGNOR, BY MESNE ASSIGNMENTS, TO BALDWIN LOCOMOTIVE WORKS, OF PHILADELPHIA, PENNSYLVANIA, A CORPORATION OF PENNSYLVANIA.

COMPRESSED-AIR LOCOMOTIVE.

959,219.  Specification of Letters Patent.  Patented May 24, 1910.

Application filed January 16, 1909. Serial No. 472,736.

*To all whom it may concern:*

Be it known that I, CHARLES G. HERMAN, a citizen of the United States, residing in Philadelphia, Pennsylvania, have invented certain Improvements in Compressed-Air Locomotives, of which the following is a specification.

The object of my invention is to so arrange two compressed air locomotives in tandem with the cabs adjoining each other and to so connect the lever mechanism, that one engineer can operate both locomotives from one cab.

In mines and other places where the height and width are limited, a single locomotive of great capacity is not available, so that two locomotives have to be used in many cases to haul the loads. By my invention I am enabled to so couple the locomotives that one engineer can operate both locomotives.

In the accompanying drawings:—Figure 1, is a side view of sufficient of two compressed air locomotives to illustrate my invention; Fig. 2, is a diagrammatic view illustrating the arrangement of tubes connecting the locomotives; Fig. 3, is a rear end view of one of the locomotives; Fig. 4, is an enlarged view of the reverse lever; Fig. 5, is an end view of the lever shown in Fig. 4, with the segment in section; Figs. 6 and 7, are detail views of the three-way valve; and Fig. 8, is a sectional view showing the pawl releasing device.

A, A are the frames of the two locomotives. B, B are the air tanks. B', B' are the low pressure reservoirs, and C is the cab of one of the locomotives; the other cab being back of the tank B, as shown in dotted lines, Fig. 1. The cab in this type of locomotive occupies about one-half the width of the locomotive, the balance of the space being occupied by the tank.

D and D' are the reversing levers—one mounted on each locomotive, and these levers are connected by rods $d$ to operating shafts $D^2$, $D^3$ respectively, and, as shown in Fig. 2, the two shafts are connected together by a coupling $D^4$ attached to the ends of each shaft by a universal joint. This construction is common to the ordinary type of compressed air locomotive. Each lever D, D' is provided with a pawl $e$ which engages a segment E, so that the lever can be locked in any position to which it is adjusted, the pawls being actuated by a trip lever $e'$ connected to the pawl by a rod $e^2$. A spring $e^3$ tends to force the pawl into engagement with the teeth of the segment E. It will be seen that when both pawls are out of engagement with the segment that one actuating lever will actuate the reverse shafts on both engines through the coupling $D^4$, and in order to operate both pawls simultaneously I provide a pawl releasing device for each lever actuated by air under pressure and controlled from either cab.

Connected to the low pressure reservoir B' is a pipe $i$ which is attached to a three-way valve casing I and has a stop cock $i'$ for cutting off the flow of air to the valve.

$i^2$ is a pipe leading from the valve casing I and this pipe is coupled to a pipe $i^3$ on the other locomotive through a flexible tube $i^4$ having a coupling $i^5$. The pipe $i^3$ is attached to a fitting N carried by the lever D'.

The valve casing I has a valve $h$ therein and in the casing is an exhaust port $h'$. The valve is so formed that when turned into one position it will couple the two pipes $i$, $i^2$, and when turned into another position it will cut off communication with the pipe $i$ and couple the pipe $i^2$ with the exhaust passage $h'$. The valve $h$ has an arm $h^2$ connected by rods $h^3$ to a lever $h^4$ pivoted at $h^5$ to the reverse lever D, and this lever in turn is connected by a rod $h^6$ to the pawl $e$. The fitting N which is secured to the reverse lever D' on the lever of the other locomotive has a piston $n$ provided with a cup $n'$ and over these pistons fits the cylindrical portion $m$ of a slide M. This slide has two arms $m'$, each slotted at $m^2$ for the reception of pins $k$ projecting from the pawl $e^4$. The fitting N and the slide M form a pawl releasing device.

It will be seen that by the above described air connection when the pawl $e$ of the lever D is raised by forcing the trip lever $e'$ toward the reverse lever, the pawl will be disengaged from the segment E at the same time the valve $h$ will be shifted by the connecting rods and lever so as to couple the two air pipes $i$, $i^2$, causing air under pressure to pass from the pipe $i$, through the valve and into the pipe $i^2$, and this pipe being coupled by the flexible tube $i^4$ to the pipe $i^3$ on the other locomotive the air will flow into the tubular fitting N and into the slide M, which will be raised owing to the pressure of the air and will lift the pawl e carried by the reverse lever D' and thus this lever will be disconnected, so that when the reverse lever D is shifted the reverse lever D' will move with it as they are connected through the shafts D², D³ and coupling D⁴. Therefore, by this construction, one engineer, or a single operator sitting in one cab can control the mechanism on both engines.

In order to make it possible to operate the engines from either cab I duplicate the above described mechanism and tubing, as clearly illustrated in Figs. 1 and 2, so that an operator located in either cab can readily control both locomotives. Secured to the lever D' is a valve casing I' and on the lever D is a fitting N' and sliding pawl releasing device M' coupled by tubing similar to the valve casing and fitting N described above.

The reverse levers are coupled to the reverse mechanism common to this type of locomotive, and this mechanism is not described as it forms no part of the present invention.

I claim:—

1. The combination of two locomotives connected together, a reverse lever on each locomotive, the reverse levers being coupled together so as to work in unison, means for retaining each lever in the position to which it is adjusted, means for releasing one of said levers, and actuating means, connected to said lever releasing means, for releasing the other lever.

2. The combination of two locomotives coupled together, a reverse lever on each locomotive, with means for coupling the two reverse levers together so that they will work in unison, pawls for locking the levers in the position to which they are adjusted, mechanism for releasing the pawls, and connecting mechanism whereby when one pawl is released the other will also be released so that the reverse levers can be moved together.

3. The combination of two locomotives coupled together, each locomotive having a reverse lever, said reverse levers being coupled together so as to move in unison, a pawl on each reverse lever for locking the lever in the position to which it is adjusted, a pawl trip lever, a valve on one reverse lever connected to the pawl trip lever, a pawl releasing device on the other reverse lever connected to the valve of the first mentioned lever, so that when the trip lever is actuated it will shift the valve to cause the fluid under pressure to operate the pawl releasing device of the other lever, releasing both levers simultaneously so that they can be operated in unison.

4. The combination of two locomotives coupled together, each locomotive having a reverse lever, means for coupling the reverse levers so that they will work in unison, a pawl carried by each lever and engaging a segment, hand means for actuating the pawl, a valve on each lever connected to the operating means, a fluid actuated pawl releasing device carried by each lever, and tubes extending from the valve on one lever to the pawl releasing device on the other lever, means for supplying fluid under pressure so that when one hand operated pawl releasing device is actuated the other pawl will be released simultaneously so as to free both reverse levers from the segment.

5. The combination of two compressed air locomotives coupled together, each carrying an air reservoir, a reversing lever on each locomotive, means for coupling the reverse levers so that they will move in unison, a hand operated pawl tripping device on each lever, a valve on each lever, a pawl releasing device on each lever, two sets of tubing, one set of tubing extending from one air reservoir to the valve of one reverse lever and from the valve to the pawl releasing device on the other lever, the other set of tubes extending from the air reservoir of the other locomotive to the valve on one lever and from the valve to the pawl releasing device on the other lever so that an operator on either locomotive can control the reverse levers on both locomotives.

6. The combination of two compressed air locomotives coupled together, a reverse lever on each locomotive, means for coupling the two levers so that they can be operated in unison, a segment on each locomotive, a pawl carried by each reverse lever and arranged to engage the segment, a spring for forcing the pawl into engagement with the segment, a hand trip lever for lifting the pawl against the pressure of the spring, a valve casing on each lever, a valve therein, two pipes coupled to the valve casing, said casing having an exhaust port, one of said pipes being connected to the air reservoir of the locomotive, the other pipe leading to a pawl releasing device on the reverse lever of the other locomotive, a pawl releasing device attached to the first mentioned reverse lever and having a movable portion engaging the pawl, and a valve on the other reverse lever controlling the action of the pawl reverse mechanism of the first mentioned lever, so that both levers can be released in unison and operated in unison.

In testimony whereof, I have signed my name to this specification, in the presence of two subscribing witnesses.

CHARLES G. HERMAN.

Witnesses:
J. H. KEOST,
JAS. H. M. HAYES.